(12) United States Patent
Kim et al.

(10) Patent No.: US 9,898,186 B2
(45) Date of Patent: Feb. 20, 2018

(54) PORTABLE TERMINAL USING TOUCH PEN AND HANDWRITING INPUT METHOD USING THE SAME

(71) Applicant: Samsung Electronics Co. Ltd., Suwon-si, Gyeonggi-do (KR)

(72) Inventors: Hwa-Kyung Kim, Seoul (KR); Joo-Yoon Bae, Seoul (KR); Ju-Youn Lee, Seongnam-si (KR); Sung-Soo Kim, Bucheon-si (KR); Jin-Ha Jun, Seoul (KR); Sang-Ok Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 13/940,607

(22) Filed: Jul. 12, 2013

(65) Prior Publication Data
US 2014/0019855 A1    Jan. 16, 2014

(30) Foreign Application Priority Data

Jul. 13, 2012 (KR) .................. 10-2012-0076514
Dec. 6, 2012 (KR) .................. 10-2012-0141221

(51) Int. Cl.
G06F 17/00     (2006.01)
G06F 3/0488    (2013.01)
G06Q 10/10     (2012.01)

(52) U.S. Cl.
CPC ......... *G06F 3/04883* (2013.01); *G06Q 10/10* (2013.01)

(58) Field of Classification Search
CPC ..................... G06F 17/242; G06F 3/04883
See application file for complete search history.

(56) References Cited

U.S. PATENT DOCUMENTS

| 5,063,600 | A  | * | 11/1991 | Norwood ...................... 382/186 |
| 5,276,794 | A  | * | 1/1994  | Lamb, Jr. ...................... 715/202 |
| 6,035,062 | A  | * | 3/2000  | Takasu ................. G06K 9/6807 382/187 |
| 6,049,329 | A  |   | 4/2000  | Zetts et al. |
| 6,611,258 | B1 | * | 8/2003  | Tanaka .................. G06F 3/0433 345/173 |
| 6,661,409 | B2 |   | 12/2003 | Demartines et al. |
| 7,587,087 | B2 |   | 9/2009  | Nurmi |
| 8,150,162 | B2 |   | 4/2012  | Du et al. |
| 2002/0080123 | A1 | * | 6/2002 | Kennedy et al. ............. 345/173 |
| 2002/0107885 | A1 |   | 8/2002 | Brooks et al. |
| 2003/0038788 | A1 |   | 2/2003 | Demartines et al. |
| 2003/0071850 | A1 | * | 4/2003 | Geidl .................... G06F 3/0481 715/781 |

(Continued)

FOREIGN PATENT DOCUMENTS

CN    101777132 A    7/2010
JP    11-126236 A    5/1999

(Continued)

*Primary Examiner* — Keith Bloomquist
(74) *Attorney, Agent, or Firm* — Jefferson IP Law, LLP

(57) ABSTRACT

An apparatus and method for a portable terminal using a touch pen and a handwriting input method using the same are provided. In the apparatus, upon receipt of a handwriting image in an input field provided by an executed application through the touch pen, the received handwriting image is converted to text, the text is inserted in the input field, and the input field with the text is displayed.

17 Claims, 15 Drawing Sheets

(56) References Cited

U.S. PATENT DOCUMENTS

| | | |
|---|---|---|
| 2003/0103034 A1* | 6/2003 | Silverbrook et al. ......... 345/156 |
| 2005/0220344 A1 | 10/2005 | Akiyama |
| 2005/0249419 A1 | 11/2005 | Rieman |
| 2006/0071910 A1* | 4/2006 | Kim et al. .................... 345/173 |
| 2006/0282575 A1 | 12/2006 | Schultz et al. |
| 2007/0286486 A1 | 12/2007 | Goldstein |
| 2009/0159342 A1 | 6/2009 | Markiewicz et al. |
| 2012/0007825 A1 | 1/2012 | Kim et al. |
| 2012/0299856 A1 | 11/2012 | Hasui |

FOREIGN PATENT DOCUMENTS

| | | |
|---|---|---|
| JP | 2000-353049 A | 12/2000 |
| KR | 10-2007-0010163 A | 1/2007 |
| RU | 2412470 C2 | 2/2011 |
| WO | 2004-097722 A1 | 11/2004 |
| WO | 2011-101940 A1 | 8/2011 |

* cited by examiner

PORTABLE TERMINAL USING TOUCH PEN AND HANDWRITING INPUT METHOD USING THE SAME

CROSS-REFERENCE TO RELATED APPLICATION(S)

This application claims the benefit under 35 U.S.C. § 119(a) of a Korean patent application filed on Jul. 13, 2012 in the Korean Intellectual Property Office and assigned Serial No. 10-2012-0076514 and a Korean patent application filed on Dec. 6, 2012 in the Korean Intellectual Property Office and assigned Serial No. 10-2012-0141221, the entire disclosures of each of which is hereby incorporated by reference.

TECHNICAL FIELD

The present disclosure relates to a portable terminal using a touch pen and a handwriting input method using the same. More particularly, the present disclosure relates to a method for performing a handwriting input to an activated application in a portable terminal.

BACKGROUND

Along with the recent growth of portable terminals, user demands for intuitive input/output methods are increasing. To enhance portability, the portable terminals get smaller and as a result, the size of a display for displaying information is relatively small as compared to a standard TV screen or a monitor. Therefore, rather than traditional User Interface (UI) methods that require an additional device (e.g., keyboard, a keypad, a mouse, etc.) for user input, portable terminals have adopted intuitive UI methods for inputting information by directly touching a screen with a finger or a touch pen or by voice. Particularly a user can make fine touches using a touch pen. However, the usage of a conventional touch pen is limited to touching a specific area of a display. Accordingly, there exists a need for inputting data to a portable terminal in various manners using a touch pen as well as applying a touch input by touching the portable terminal with the touch pen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the problems and/or disadvantages and to provide at least the advantages described below. Accordingly, an aspect of the present disclosure is to provide a method and apparatus for inputting information using a handwriting-based User Interface (UI) in a portable terminal.

Another aspect of the present disclosure is to provide a method and apparatus for inputting information to a currently activated application using a handwriting-based UI in a portable terminal.

Another aspect of the present disclosure is to provide a method and apparatus for inputting information to a displayed input field provided by an application using a handwriting-based UI in a portable terminal.

A further aspect of the present disclosure is to provide an apparatus and method for providing a different UI for inputting information to a displayed input field provided by an application depending on whether a user touches the input field with a finger or a touch pen in a portable terminal.

In accordance with another aspect of the present disclosure, a handwriting input method using a touch pen in a portable terminal is provided. In the method, at least one input field provided by an application is displayed by executing the application, a handwriting image is received in the at least one input field directly through the touch pen, the received handwriting image is converted to text, the text is inserted in the input field, and the input field with the text is displayed.

The reception of a handwriting image may include providing a handwriting input layer overlapping the input field and receiving the handwriting image in the handwriting input layer, and the conversion of the received handwriting image may include converting the handwriting image received in the handwriting input layer to text.

If there are a plurality of the input fields, the providing of the handwriting input layer may include providing a plurality of handwriting input layers corresponding to the plurality of input fields, and the conversion of the received handwriting image may include converting a handwriting image received in each of the handwriting input layers to text.

If at least one populated input field of the plurality of input fields includes text, the providing of a plurality of handwriting input layers may include providing handwriting input layers corresponding to input fields except for the populated input field.

The conversion of the received handwriting image may include, if a conversion button is selected, converting all of the handwriting images received in the plurality of handwriting input layers to text.

The providing of a handwriting input layer may include providing an erase button for erasing the handwriting image received in the handwriting input layer, and the providing of a handwriting input layer may further include erasing at least a part of the received handwriting image, upon selection of the erase button.

The displaying of at least one input field may include displaying a plurality of time units provided by the application, and displaying, upon selection of one of the plurality of time units, an input field for inputting contents related to the selected time unit.

The conversion of the received handwriting image may include converting a handwriting image received in a first handwriting input layer of the plurality of handwriting input layers to a first type with priority, the first type being preset to one of a first language, a second language, numerals, and special symbols, and converting a handwriting image received in a second handwriting input layer of the plurality of handwriting input layers to a second type with priority, the second type being preset to one of the first language, the second language, the numerals, and the special symbols, different from the first type.

The conversion of the received handwriting image may include receiving coordinates of points touched in the input field, storing the coordinates of the points as strokes, generating a stroke array list using the strokes, and converting the handwriting image to the text using a pre-stored handwriting library and the stroke array list.

The handwriting input method may further include receiving a finger touch on the input field from a user, providing a keypad for receiving a finger input, receiving selected text through the keypad, inserting the selected text in the input field, and displaying the input field with the inserted text.

In accordance with another embodiment of the present disclosure, a handwriting input method in a portable terminal is provided. In the method, at least one input field provided by an application is displayed by executing the application, an input of a user touch on the at least one input field is received, it is determined whether the user touch is a finger touch or a pen touch of a touch pen, if the user touch is a finger touch, a keypad is provided for receiving a finger input, text received through the keypad is inserted in the input field, and the input field with the inserted text is displayed, and if the user touch is a pen touch of the touch pen, a handwriting input layer is provided overlapping the input field, a handwriting image received in the handwriting input layer is converted to text, the text is inserted in the input field, and the input field with the text is displayed.

In accordance with another embodiment of the present disclosure, a portable terminal using a touch pen is provided. In the portable terminal, a touch screen displays at least one input field provided by an application by executing the application and receives a handwriting image in the at least one input field directly through the touch pen, and a controller converts the handwriting image received from the touch screen to text, inserts the text in the input field, and displays the input field with the text.

The controller may provide a handwriting input layer overlapping the input field, for receiving the handwriting image, and convert the handwriting image received in the handwriting input layer to text.

If there are a plurality of the input fields, the controller may provide a plurality of handwriting input layers corresponding to the plurality of the input fields and convert a handwriting image received in each of the handwriting input layers to text.

If at least one populated input field of the plurality of the input fields includes text, the controller may provide handwriting input layers corresponding to input fields except for the populated input field.

If a conversion button is selected, the controller may convert all of the handwriting images received in the plurality of handwriting input layers to text.

The controller may provide an erase button for erasing the handwriting image received in the handwriting input layer, and upon selection of the erase button, the controller may erase at least a part of the received handwriting image.

The touch screen may display a plurality of time units provided by the application, and upon selection of one of the plurality of time units, the touch screen may display an input field for inputting contents related to the selected time unit.

The controller may convert a handwriting image received in a first handwriting input layer among the plurality of handwriting input layers to a first type with priority, the first type being set to one of a first language, a second language, numerals, and special symbols, and may convert a handwriting image received in a second handwriting input layer among the plurality of handwriting input layers to a second type with priority, the second type being set to one of the first language, the second language, the numerals, and the special symbols, different from the first type.

The controller may receive coordinates of points touched in the input field, store the coordinates of the points as strokes, generate a stroke array list using the strokes, and convert the handwriting image to the text using a handwriting library and the stroke array list.

If the touch screen receives a finger touch on the input field from a user, the controller provides a keypad for receiving a finger input, insert text selected through the keypad in the input field, and display the input field with the inserted text.

In accordance with a further embodiment of the present disclosure, a portable terminal using a touch pen is provided. In the portable terminal, a touch screen displays at least one input field provided by an application by executing the application and receiving an input of a user touch on the at least one input field, and a controller determines whether the user touch is a finger touch or a pen touch of the touch pen, if the user touch is a finger touch, provides a keypad for receiving a finger input, inserts text received through the keypad in the input field, and displays the input field with the inserted text, and if the user touch is a pen touch of the touch pen, provides a handwriting input layer overlapping the input field, converts a handwriting image received in the handwriting input layer to text, inserts the text in the input field, and displays the input field with the text.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description in conjunction with the accompanying drawings, in which:

FIGS. 7A and 7B are examples of displaying text in input fields of a medical record application in a portable terminal according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Likewise, some components are exaggerated, omitted, or schematically shown in the attached drawings and the size of each component does not fully reflect its actual size. Therefore, the present disclosure is not limited by relative sizes or intervals of components shown in the attached drawings.

Figure 1:
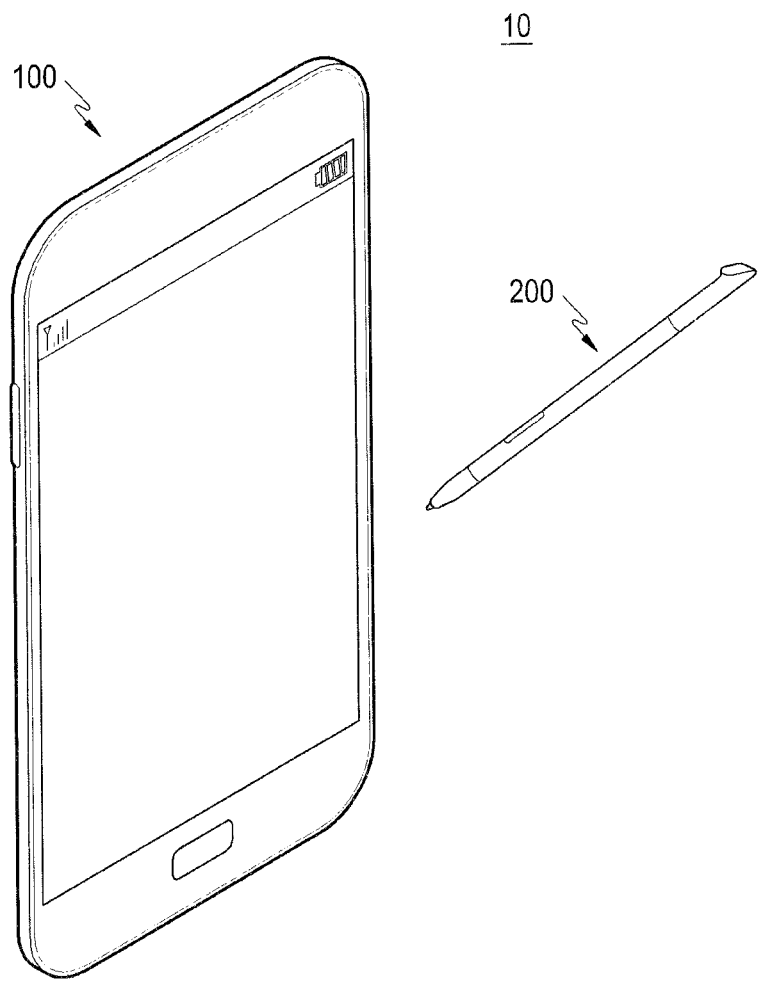
FIG. 1 illustrates a handwriting input system according to an embodiment of the present disclosure.

FIG. 1 illustrates a handwriting input system according to an embodiment of the present disclosure.

Referring to FIG. 1, a handwriting input system 10 may include a portable terminal 100 and a touch pen 200. A user may input a handwriting image onto a screen of the portable terminal 100 via the touch pen 200 in the handwriting input system 10. While the handwriting input system 10 is configured as illustrated in FIG. 1 according to the embodiment of the present disclosure, components for other functions may be added to the handwriting input system 10.

Figure 2:
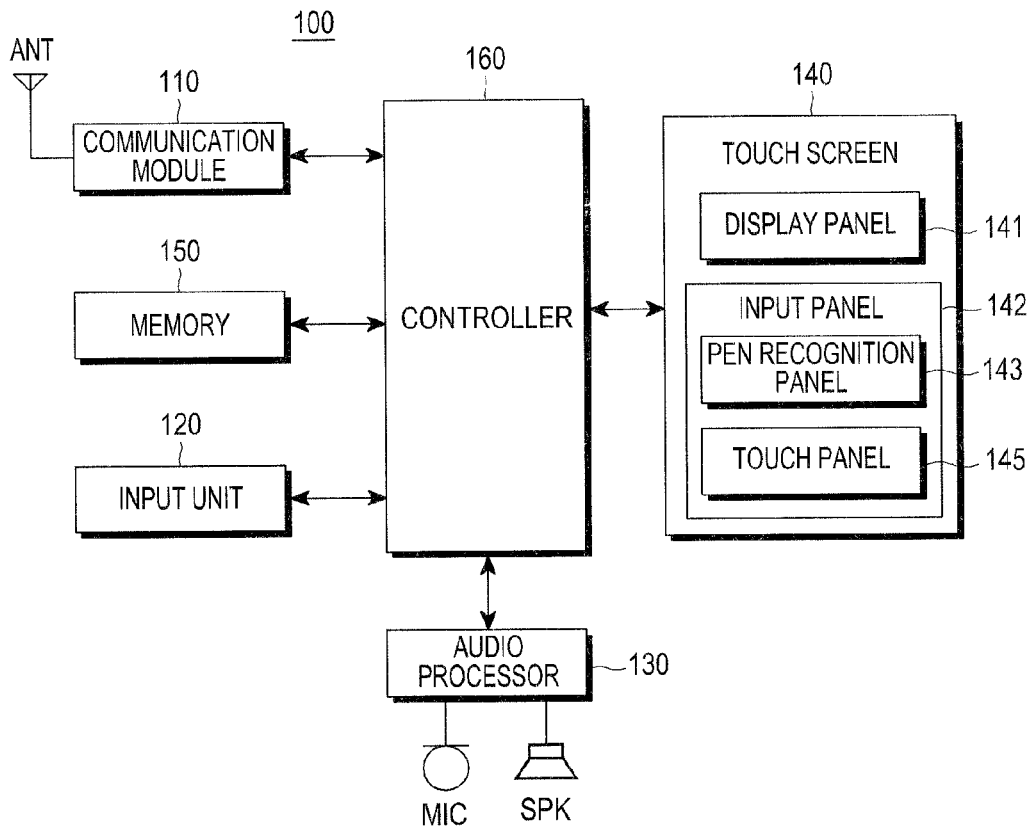
FIG. 2 is a block diagram of a portable terminal according to an embodiment of the present disclosure.

FIG. 2 is a block diagram of a portable terminal according to an embodiment of the present disclosure.

Referring to FIG. 2, a portable terminal 100 according to the present disclosure, such as the portable terminal 100, may include a communication module 110, an input unit 120, an audio processor 130, a touch screen 140, a memory 150, and a controller 160.

The touch screen 140 may include a display panel 141 for performing a display function on information output from the portable terminal 100 and an input panel 142 for receiving user input. The input panel 142 may be configured with at least one panel for sensing various inputs (e.g., a single-touch or multi-touch input, a drag input, a handwriting input, a drawing input, etc.) that a user applies with a finger or an object such as a pen. For example, the input panel 142 may be configured with one panel capable of sensing both a finger input and a pen input or two panels such as a touch panel 145 capable of sensing a finger input and a pen recognition panel 143 capable of sensing a pen input. By way of example, the present disclosure will be described in the context of the input panel 142 including the touch panel 145 for sensing a finger input and the pen recognition panel 143 for sensing a pen input.

The display panel 141 may be a suitable display device such as a Liquid Crystal Display (LCD) panel, an Active Matrix Organic Light Emitting Diode (AMOLED) panel, etc. The display panel 141 may display various screens related to operation states of the portable terminal 100, application execution, and service provisioning. Particularly, the display panel 141 may display an application including an input field according to an embodiment of the present disclosure.

The touch panel 141 may sense a user's touch input. The touch panel 145 may be implemented by a touch film, a touch sheet, or a touch pad, for example. The touch panel 145 senses a touch input and outputs a touch event value corresponding to the sensed touch signal. Information corresponding to the sensed touch signal may be displayed on the display panel 141. The touch panel 145 may receive a manipulation signal based on a user's touch input through various input sources. For example, the touch panel 145 may sense a touch input of a user's body part (e.g., a finger) or a physical tool (e.g., a pen). According to an embodiment of the present disclosure, the touch panel 145 may be implemented via a capacitive touch panel. In this case, the touch panel 145 is formed by coating thin metal conductive films (e.g. Indium Tin Oxide (ITO) films) on both surfaces of a glass so that current may flow on the glass surfaces and coating a dielectric material over the thin metal conductive films so that a charge may be stored. When an object touches the surface of the touch panel 145, a charge migrates to the touched point due to static electricity. The touch panel 145 senses the touched point by recognizing a variation in the amount of charge migration-incurred current and thus tracks the touch event. A touch event may occur to the touch panel 145 via a user's finger and an object that can cause a capacitance variation, for example, a conductive object.

The pen recognition panel 143 senses a pen's proximate input or touch input according to a manipulation of the touch pen 200 (e.g. a stylus pen or a digitizer pen) and outputs a pen proximity event or pen touch event corresponding to the sensed pen's proximate input or touch input. The pen recognition panel 143 may operate in an Electro Magnetic Resonance (EMR) scheme and sense a touch input or proximate input according to a variation in the strength of an electromagnetic field caused by a pen's proximity or touch. Specifically, the pen recognition panel 143 may include an electromagnetic induction coil sensor (not shown) and an electric signal processor (not shown). The electromagnetic induction coil sensor has a grid structure in which a plurality of loop coils are arranged in a first direction and a plurality of coils are arranged in a second direction perpendicular to the first direction. The electric signal processor provides an AC signal having a predetermined frequency to the loop coils of the electromagnetic induction coil sensor. When a pen having a resonant circuit is placed in the vicinity of a loop coil of the pen recognition panel 143, a magnetic field transmitted from the loop coil generates current based on mutual electromagnetic induction through the resonant circuit of the pen. An induction field is created based on the current from the coil of the resonant circuit in the pen and the pen recognition panel 143 detects the induction field in a loop coil placed in a signal reception state, thereby sensing the proximate position or touched position of the pen. The pen recognition panel 143 can sense the proximity and touch of any object as far as the object can generate electromagnetic induction-based current. In an embodiment of the present disclosure, the pen recognition panel 143 senses proximity of a pen or a pen touch. This pen recognition panel 143 may be disposed at a predetermined position of the portable terminal and may be activated upon generation of a predetermined event or by default. The pen recognition panel 143 may an area under the display panel 141 such as, for example, an area that covers the display area of the display panel 141.

In the event that the portable terminal 100 supports a communication function such as a mobile communication function, the portable terminal 100 may include the communication module 110. The communication module 110 may perform communication functions such as a phone call, a video call, a chat function, message transmission and reception, etc.

The input unit 120 may be configured via side keys or a separately procured touch pad. The input unit 120 may include suitable input sources such as a button for turning on or turning off the portable terminal 100, a home key for returning the portable terminal 100 to a home screen, etc.

The audio processor 130 includes a speaker (SPK) for outputting an audio signal and a microphone (MIC) for receiving an audio signal. The audio processor 130 may control the vibration magnitude of a vibration module (not shown). For example, the audio processor 130 may differentiate the vibration magnitude according to a received gesture input. That is, when processing gesture recognition information of gesture input, the audio processor 130 may control the vibration module to have a different vibration magnitude for each recognized gesture input.

The memory 150 is configured to store various programs and data required to operate the portable terminal 100 according to the present disclosure. For example, the memory 150 may store an Operating System (OS) needed for operating the portable terminal 100 and function programs for supporting screen output on the display panel 141.

The controller 160 may be configured to receive a handwriting image through the touch pen 200 and display the handwriting image. The controller may be configured to control signal processing, data processing, and function execution in relation to a handwriting input. For example, the controller 160 may be configured to provide a handwriting input layer that overlaps an input field of a displayed application, convert a user's handwriting image input to the handwriting input layer to text, insert the text in the input field, and display the input field with the text.

Figure 3:
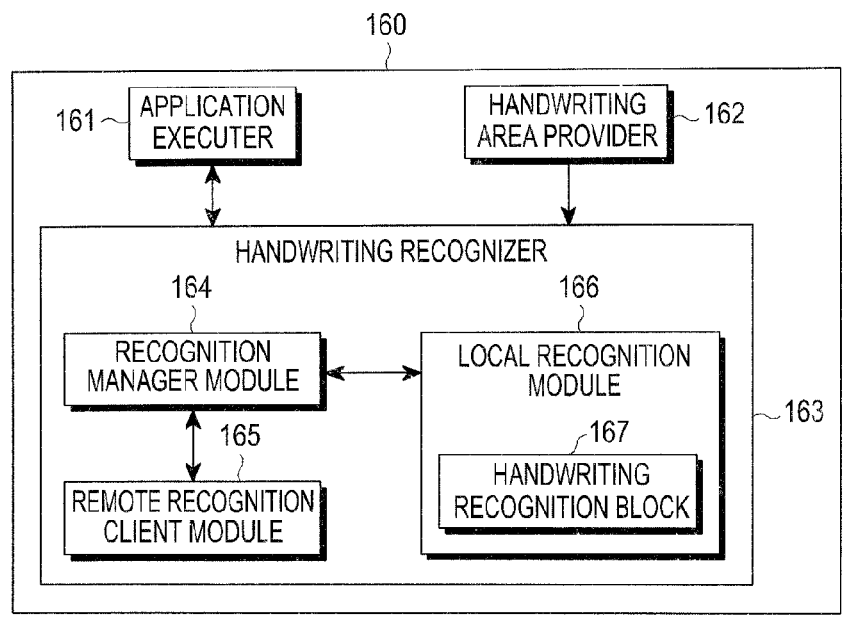
FIG. 3 is a block diagram of a controller according to an embodiment of the present disclosure.

FIG. 3 is a block diagram of a controller according to an embodiment of the present disclosure.

Referring to FIG. 3, a controller 160 of the present disclosure may be configured to include an application executor 161, a handwriting area provider 162, and a handwriting recognizer 163.

The application executor 161 may execute a specific application based on a user command (e.g. when the user selects an icon corresponding to the specific application on a background screen) or upon power-on. The application executor 161 may display the executed application on the display panel 141 and provide at least one input field on the display panel 141.

The handwriting area provider 162 may be configured to provide a handwriting input layer for recognizing a handwriting image input by the touch pen 200. For example, the handwriting area provider 162 may provide the handwriting input layer that overlaps the input field provided by the displayed application. If there are multiple input fields included in the application, the handwriting area provider 162 may provide a handwriting input layers for each of the input field. The user may write in the handwriting input layers using the touch pen 200.

A handwriting input layer may be provided overlapped with an input field in an Android® device, for example, in the following manner.

First, layouts that determine the positions of an input field and a handwriting input layer on a screen may be programmed to eXtensible Markup Language (XML) code as follows.

```
<FrameLayout android:id="@+id/nli_title_layout" ......... >
.........
<TextView android:id="@+id/title"
    style="@style/TextAppearance.EditEvent_Value" .........
    android:minHeight="48dip" androidingleLine="true" />
.........
<com.samsung.nli.util.view.NliSCanvasView
    android:id="@+id/nli_title_nliSCanvasView" .........
    android:focusable="true" />
```

Referring to the above, a developer may define the layout of the input field by invoking a TextView method. If the input field within the method is, for example, a title, the developer may define a position or a size attribute in relation to the title. In addition, the developer may define a position or size attribute of the handwriting input layer for receiving a handwriting image by invoking an nli_title_nliSCanvasView method. Since the nli_title_nliSCanvasView method shares the same parent with the TextView method, the position and size attributes of the handwriting input layer may be the same as those of the input field.

The nli_title_nliSCanvasView method may include an nli_title_eraseImageButton method, which is related to an erase button for erasing a part of a handwriting input to the handwriting input layer.

Then, the following instructions may be written to invoke the layouts defined in the XML code.

```
mTitleTextView = (TextView) view.findViewById(R.id.title);
titleLayout = (FrameLayout) view.findViewById(R.id.nli_title_layout);
titleSCanvasView = (NliSCanvasView)
    view.findViewById(R.id.nli_title_nliSCanvasView);
titleEraseImageButton = (ImageButton)
    view.findViewById(R.id.nli_title_eraseImageButton);
titleSCanvasView.setContent(mActivity, titleEraseImageButton,
    mTitleTextView);
```

Referring to the above program, it is possible to invoke values related to TextView, FrameLayout, NliSCanvasView, and ImageButton attributes written in the XML code, combine these values with values invoked using a titleSCanvasView.setContent method, and arrange the combined values.

The handwriting recognizer 163 receives a handwriting image input to the handwriting input layer by input source such as the touch pen 200 as input information. The handwriting recognizer 163 may be configured to recognize the input handwriting image and convert the recognized handwriting image to machine-readable text. For this purpose, the handwriting recognizer 163 may be configured to include a recognition manager module 164 for providing overall control to output a recognized result of input information, a remote recognition client module 165, and a local recognition module 166 for recognizing input information. The remote recognition client module 165 may transmit an input handwriting image to a server (not shown) to recognize the handwriting image. The remote recognition client module 165 may receive text being a recognized result of the handwriting image from the server. Meanwhile, the local recognition module 166 may be configured to include a handwriting recognition block 167 for recognizing input information based on a handwriting image. Specifically, the handwriting recognition block 167 may receive the coordinates of touched points from the pen recognition panel 143, store the coordinates of the touched points as strokes, and generate a stroke array list with the strokes. The handwriting recognition block 167 may recognize the handwriting image using a handwriting library and the generated stroke array list.

Meanwhile, the handwriting recognizer 163 may perform handwriting recognition based on a text type. If the handwriting area provider 162 provides a plurality of handwriting input layers, the handwriting recognizer 163 may recognize a handwriting image input using a first type of a first priority preset in one of the plurality of handwriting input layers. The first type of a first priority has been preset from among a first language, a second language, digits, and special symbols. The handwriting recognizer 163 may convert the recognized handwriting image to text of the first type. In this case, the handwriting recognizer 163 may receive information required for recognizing text in a handwriting image using the first type from the application executor 161. For example, if the type of a handwriting input to an input field provided by an application is predetermined, the application executor 161 may provide information about the type of a handwriting input into the input field to the handwriting recognizer 163. Thus, when a handwriting image is input to a handwriting input layer, the handwriting recognizer 163 may recognize the handwriting image according to the type of a handwriting input indicated by the application executor 161.

The handwriting recognizer 163 may provide the recognized text to the application executor 161. In another example, if multiple handwriting images are input into corresponding handwriting input layers, the handwriting recognizer 163 may generate multiple texts by recognizing the respective handwriting images and provide the multiple texts to the application executor 161.

The application executor 161 may insert the text received from the handwriting recognizer 163 into the input field of the executed application and display of the input field with the text on the display panel 141. In another example, upon receipt of the multiple texts corresponding to a plurality of handwriting images from the handwriting recognizer 163, the application executor 161 may store the texts in input fields corresponding to the texts respectively and display of the plurality of input fields with the multiple texts on the display panel 141.

Figure 4:
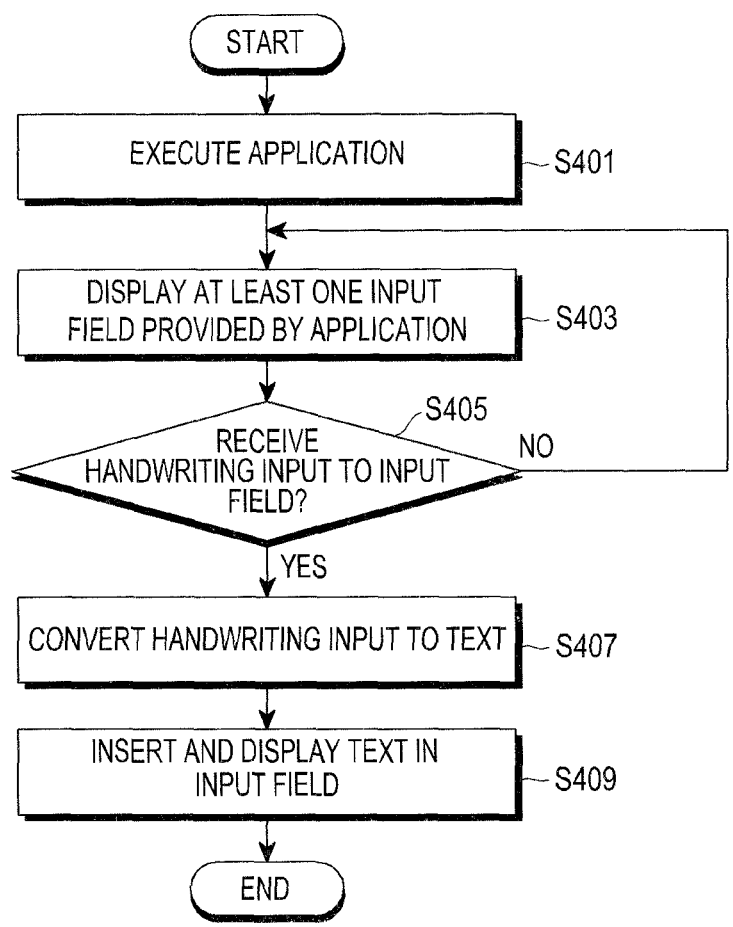
FIG. 4 is a flowchart illustrating a handwriting input method in a portable terminal according to an embodiment of the present disclosure.

FIG. 4 is a flowchart illustrating a handwriting input method in a portable terminal according to an embodiment of the present disclosure.

Referring to FIG. 4, upon user request or power-on, the portable terminal, such as the portable terminal 100, may execute an application at operation S401. The application may be predetermined.

When the portable terminal 100 displays the application on the display panel 141, at least one input field provided by the application may be displayed on the display panel 141 at operation S403. That is, the portable terminal 100 may display a screen with at least one input field provided by the application on the display panel 141.

The portable terminal 100 may receive a handwriting image that the user has input into the input field with the touch pen 200 at operation S405. For example, the portable terminal 100 may provide a handwriting input layer that overlaps the input field to receive a handwriting image. The handwriting input layer is a virtual layer displayed on the application that is configured to receive a handwriting image. When an application including an input field is displayed and a predefined user gesture input (e.g. a swipe at a part of the portable terminal 100 using the touch pen) is received, or when the touch pen 200 is placed near the portable terminal 100, a handwriting input layer may be automatically provided. The handwriting input layer may be transparent or semi-transparent, for example.

The portable terminal 100 may receive a handwriting image in the handwriting input layer through the touch pen 200. The size of the handwriting input layer may not be limited by the size of the displayed input field. The handwriting input layer may be larger than the input field. That is, reception of a user's handwriting input into the input field through the touch pen allows the user's handwriting image input to the input field to extend outside of the input field and the user's handwriting image is received in the input field.

In another example, the input field may take the form of one column. In this case, a handwriting input layer may be provided in correspondence with the single column. That is, even though the user writes in two columns in the handwriting input layer, the portable terminal 100 may convert the handwriting image of each column in the handwriting input layer to text, combine the text of the two columns into one column of text, and insert the one column of text into the input field.

In a further example, in the case that a plurality of input fields are included in the application, the portable terminal 100 may provide a plurality of handwriting input layers corresponding to the plurality of input fields. The handwriting input layers may partially overlap with one another. If the user writes in an overlapped area between the handwriting input layers, the portable terminal 100 may determine which layer the handwriting image belongs to based on the input order or starting position of the handwriting image. For example, the portable terminal 100 may determine that the handwriting image input to the overlapped area belongs to a handwriting input layer corresponding to the starting position of the handwriting image.

The portable terminal 100 may convert the handwriting image received in the handwriting input layer to text at operation S407. If a plurality of handwriting images are received in a plurality of handwriting input layers, the portable terminal 100 may convert each of the handwriting images to text.

The portable terminal 100 may insert the text into the input field and display the input field with the text at operation S409. In the case that text is converted from a plurality of handwriting images, the portable terminal 100 may insert the text into the respective input fields and display the input fields with the text.

Figure 5:
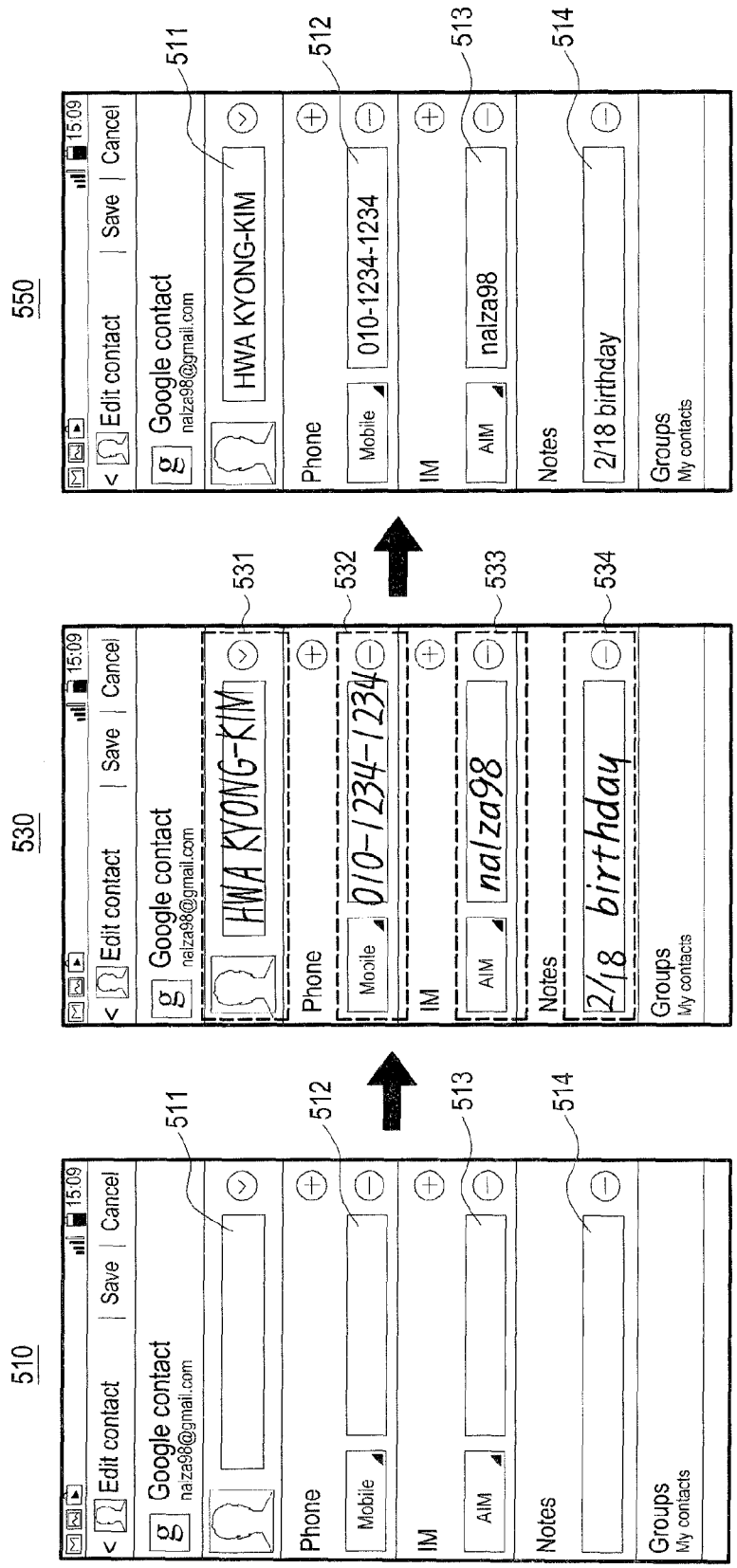
FIG. 5 illustrates an example of displaying text in input fields of an application in a portable terminal according to an embodiment of the present disclosure.

FIG. 5 illustrates an example of displaying text in input fields of an application in a portable terminal according to an embodiment of the present disclosure.

Referring to FIG. 5, the portable terminal, such as the portable terminal 100, may display a contact registration application including a plurality of input fields 511 to 514, as indicated by reference numeral 510.

The portable terminal 100 may provide a plurality of handwriting input layers 531 to 534 corresponding to the input fields 511 to 514 on the input fields 511 to 514, as illustrated by reference numeral 530. The portable terminal 100 may receive handwriting inputs from the user through the handwriting input layers 531 to 534. The portable terminal 100 may receive a handwriting image 'Hwa Kyong-KIM' in the handwriting input layer 531, a handwriting image '010-1234-1234' in the handwriting input layer 532, a handwriting image 'nalza98' in the handwriting input layer 533, and a handwriting image '2/18 birthday' in the handwriting input layer 534.

The portable terminal 100 may convert the handwriting images to text, as indicated by reference numeral 550. The text may be inserted into and displayed in the input fields 511 to 514. The portable terminal 100 may insert text 'Hwa Kyong-KIM' converted from the handwriting image received through the handwriting input layer 531 in the input field 511, text '010-1234-1234' converted from the handwriting image received through the handwriting input layer 532 in the input field 512, text 'nalza98' converted from the handwriting image received through the handwriting input layer 533 in the input field 513, and text '2/18 birthday' converted from the handwriting image received through the handwriting input layer 534 in the input field 514.

Figure 6:
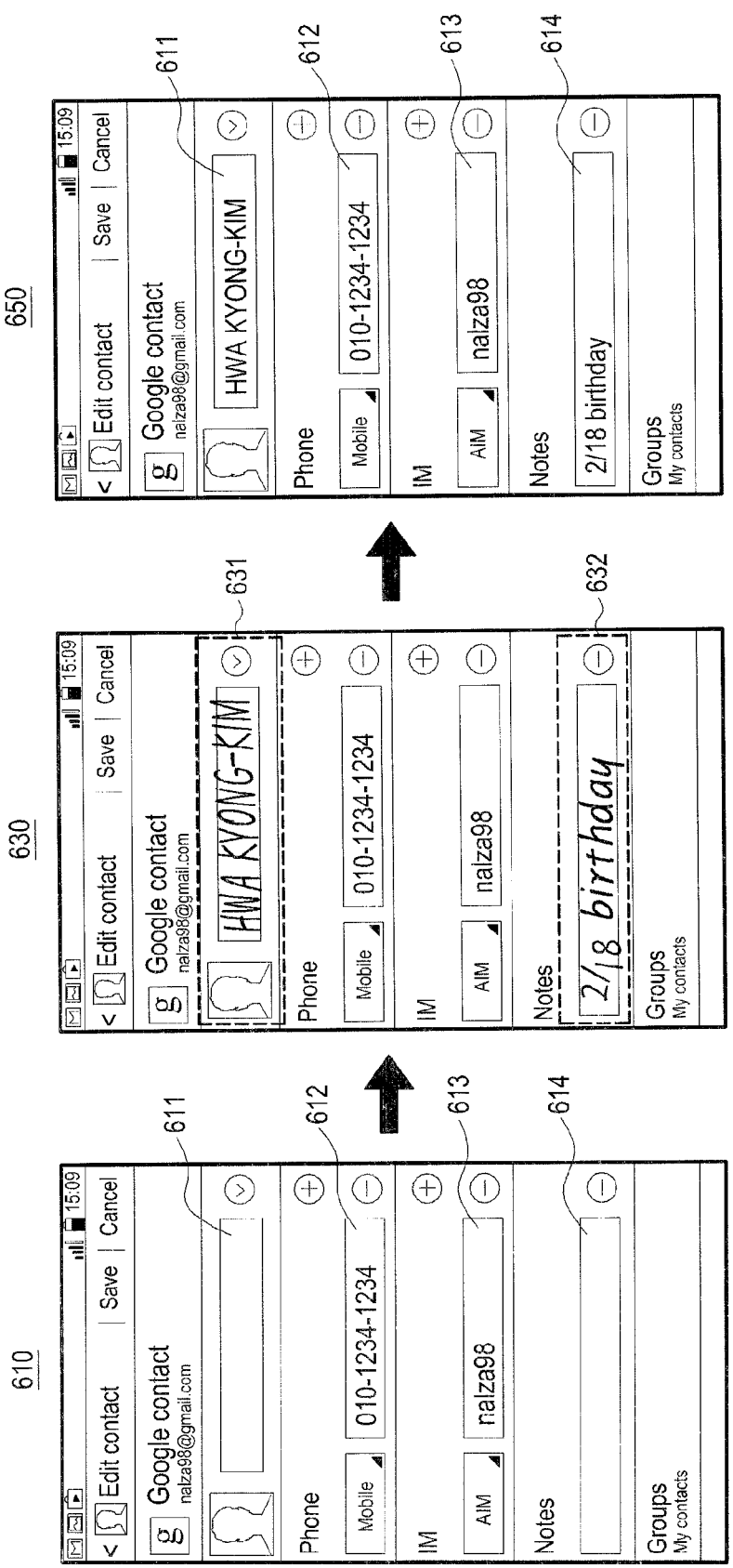
FIG. 6 illustrates another example of displaying text in input fields of an application in a portable terminal according to an embodiment of the present disclosure.

FIG. 6 illustrates another example of displaying text in input fields of an application in a portable terminal according to an embodiment of the present disclosure.

Referring to FIG. 6, a portable terminal, such as the portable terminal 100, may display an application including a plurality of input fields 611 to 614, as indicated by reference numeral 610. Text may be already inserted in input fields 612 and 613. Thus, the content in input fields 612 and 613 is already determined and the user does not need to write in the input fields 612 and 613.

The portable terminal 100 may provide handwriting input layers 631 and 632 on the other input fields 611 and 614 except for the input fields 612 and 613 already having text, as illustrated at reference numeral 630. In other words, the plurality of handwriting input layers 631 and 632 may be provided only on the input fields 611 and 614 among the plurality of input fields 611 to 614.

Handwriting inputs may be received through the handwriting input layers 631 and 632 from the user. The portable terminal 100 may insert text into which the received handwriting images are converted in the fields 611 and 614, as illustrated at reference numeral 650.

Figure 7A:
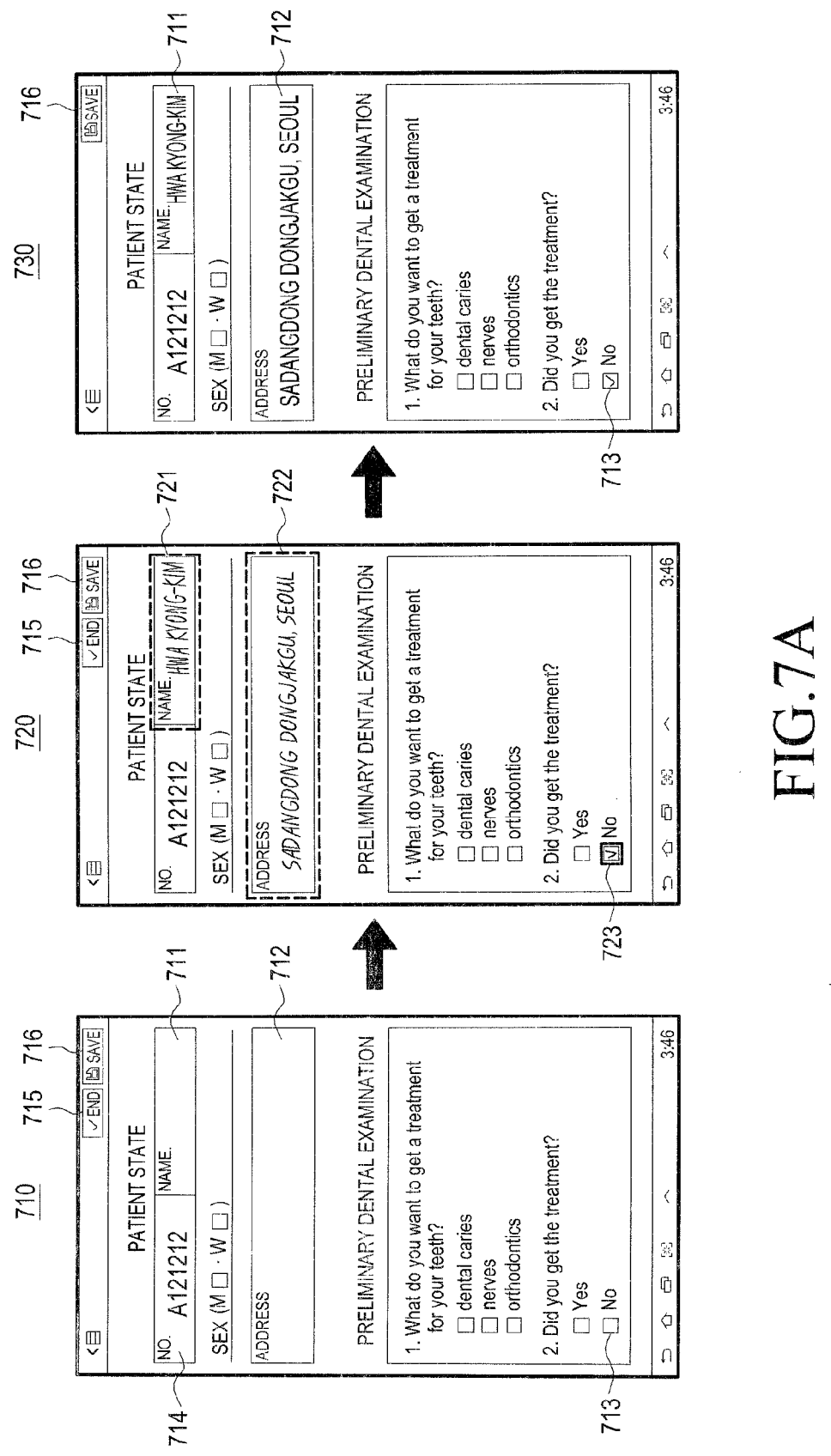
Figure 7B:
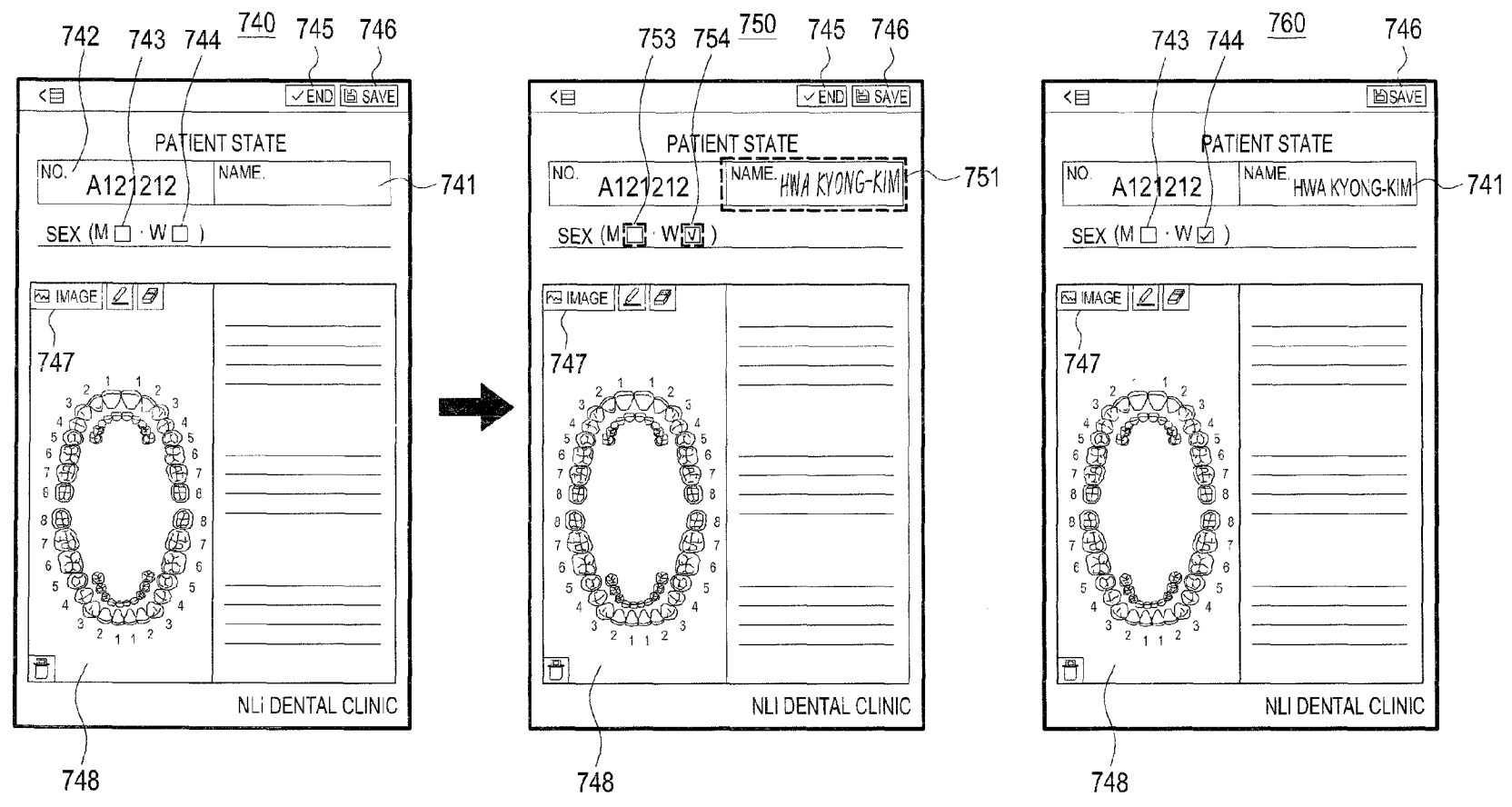

FIGS. 7A and 7B are examples of displaying text in input fields of a medical record application in a portable terminal 100 according to an embodiment of the present disclosure.

FIG. 7A illustrates an example of recording information in a patient medical chart using an input method according to the present disclosure.

Referring to FIG. 7A, the portable terminal, such as the portable terminal 100, may display a medical record application including a plurality of input fields as illustrated at reference numeral 710. The medical record application may include an end button 715, a save button 716, and a plurality of input fields 711 to 714. After the input of a handwriting image into a medical chart with a touch pen, the end button 715 is used to convert the input handwriting image into text. The end button 715 may be called by various names including a recognition button, a conversion button, etc.

The save button 716 is a button used to save a handwriting image input to the medical chart. The plurality of input fields 711 to 714 are areas in which patient information or medical information is recorded. Among the input fields 711 to 714, patient information or medical information may be already recorded as illustrated by input field 714.

The portable terminal 100 may provide a plurality of handwriting input layers 721, 722 and 723 corresponding to the input fields 711, 712 and 713, respectively, as illustrated at reference numeral 720. A handwriting input layer may not be provided for the input field 714 already having information. However, if the user wants to amend the text in the input field 714, a handwriting input layer may be provided on the input field 714 already having the information. Subsequently, the portable terminal 100 may receive handwriting inputs from the user through the handwriting input layers 721, 722 and 723 corresponding to a patient name, a patient address, and preliminary medical examination items. When the user selects the end button 715, the portable terminal 100 may recognize the handwriting images input to the handwriting input layers 721, 722 and 723 and convert the recognized handwriting images to text.

The portable terminal 100 may recognize the handwriting images received as patient information and acquire text corresponding to the respective handwriting images, 'Hwa Kyong-KIM', 'Sadangdong Dongjakgu, Seoul', and a check mark, as illustrated at reference numeral 730. The portable terminal 100 may insert the acquired text in the respective input fields 711, 712 and 713 and display the input fields 711, 712 and 713 with the ext.

FIG. 7B illustrates another example of recording information in a patient medical chart using an input method according to the present disclosure.

Referring to FIG. 7B, a portable terminal, such as the portable terminal 100, may display a medical record application including a plurality of input fields as illustrated at reference numeral 740. The medical record application may include an end button 745, a save button 746, and a plurality of input fields 741 to 744. The end button 745 is used to convert a handwriting image, which a user has input to a medical chart with a touch pen, into text by recognizing the handwriting image. The save button 746 is a button used to save the handwriting and a patient image 748. A user-input handwriting image or the patient image 748 may be saved automatically at every predetermined interval without selection of the save button 746. The plurality of input fields 741 to 744 are areas in which patient information or medical information is recorded. Among the input fields 741 to 744, patient information or medical information may be already recorded in input field 742.

The portable terminal 100 may provide a plurality of handwriting input layers 751, 753 and 754 corresponding to the input fields 741, 743 and 744, respectively. A handwriting input layer may not be provided for the input field 742 already having information. Subsequently, the portable terminal 100 may receive handwriting images from the user through the handwriting input layers 751, 753 and 754 such as a patient name and a patient gender. When the user selects the end button 745, the portable terminal 100 may recognize the handwriting images input to the handwriting input layers 751, 753 and 754 and convert the recognized handwriting images into text. Text conversion may not be performed for the handwriting input layer 753 in which the user has not input a handwriting image.

The portable terminal 100 may recognize the handwriting images received as patient information and acquire text or information corresponding to the respective handwriting images, 'Hwa Kyong-KIM' and a check mark, as illustrated at reference numeral 760. The portable terminal 100 may insert the acquired text and display the text or information in the respective input fields 741 and 744.

The image area 748 is an area in which the user may insert or replace a patient image on the medical chart. The user may select an image button 747 to add or replace a patient image. The patient image may be stored in the portable terminal 100 or an external storage device (not shown) of the portable terminal 100, or may be captured in real time through the portable terminal 100.

Figure 7C:
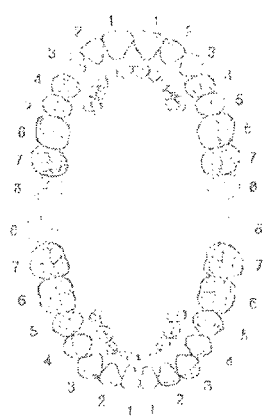
FIG. 7C illustrates images displayed in an image area of a medical record application in a portable terminal according to an embodiment of the present disclosure.
Figure 7C:
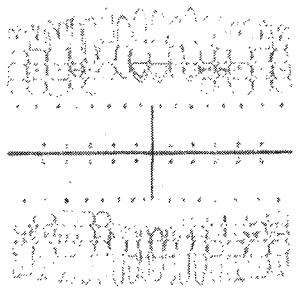
Figure 7C:
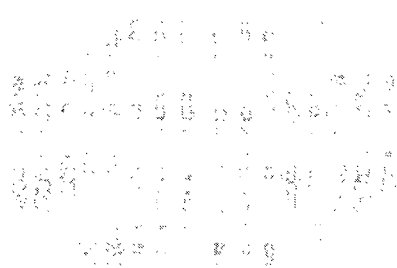

FIG. 7C illustrates images displayed in an image area of a medical record application in a portable terminal according to an embodiment of the present disclosure.

Referring to FIG. 7C, images 771, 772 and 773 that can be displayed in the image area 748 of the medical record application. The stored or captured image may be managed in a group including a plurality of images, such as an album. In this case, when the user makes a specific gesture (e.g., a swipe) in the image area 748, the image of the image area 748 may be replaced with another image in the same group. For example, the images 771, 772 and 773 may be managed in one group and replaced in response to a user's specific gesture. As described above, when the present disclosure is used in a clinic, a medical doctor can quickly record a patient's state and readily manage the record in a medical chart provided by the portable terminal 100 using a touch pen.

Figure 8A:
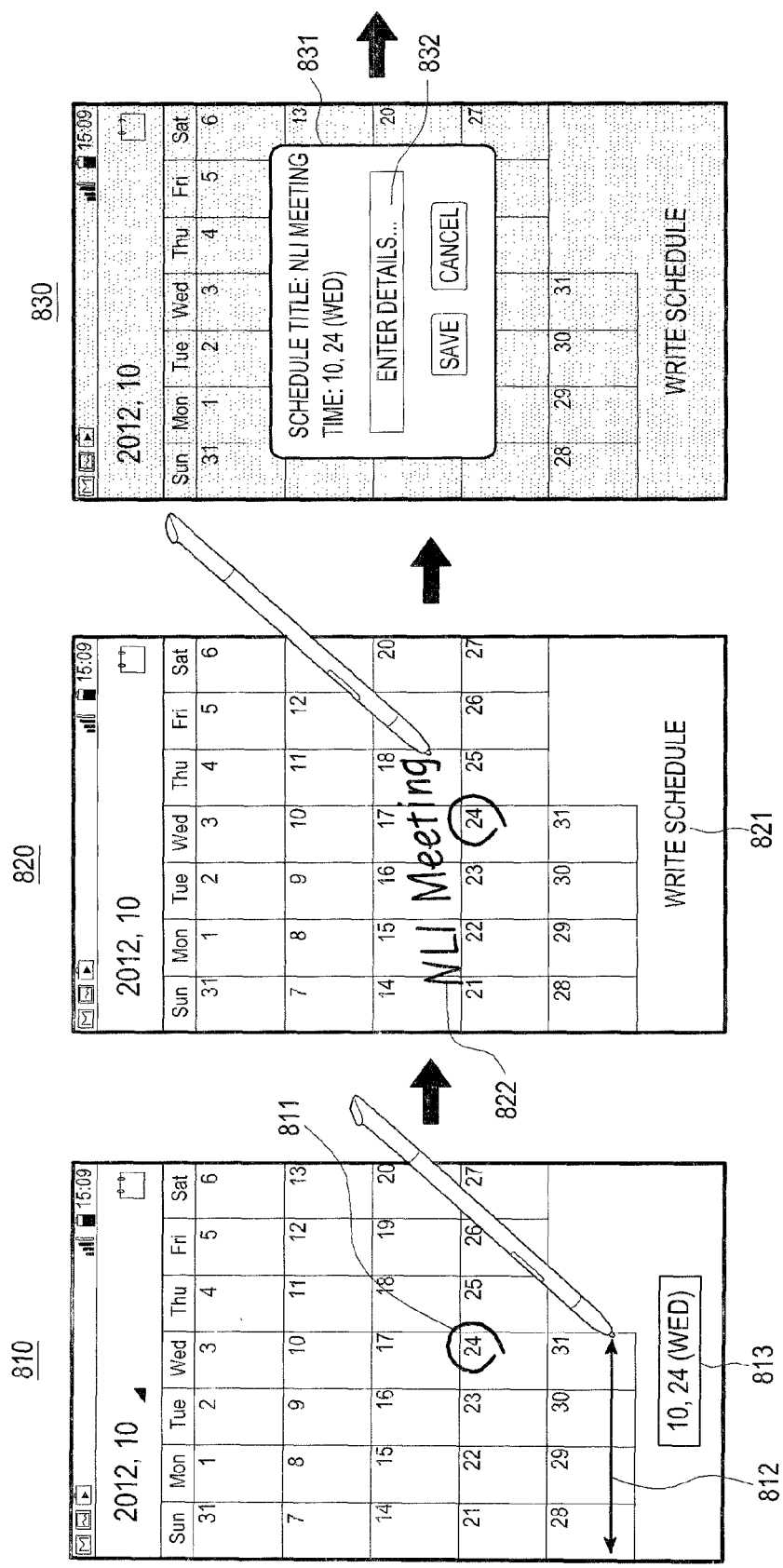
FIGS. 8A and 8B illustrate an example of displaying text in input fields of a scheduler application in a portable terminal according to an embodiment of the present disclosure.
Figure 8B:
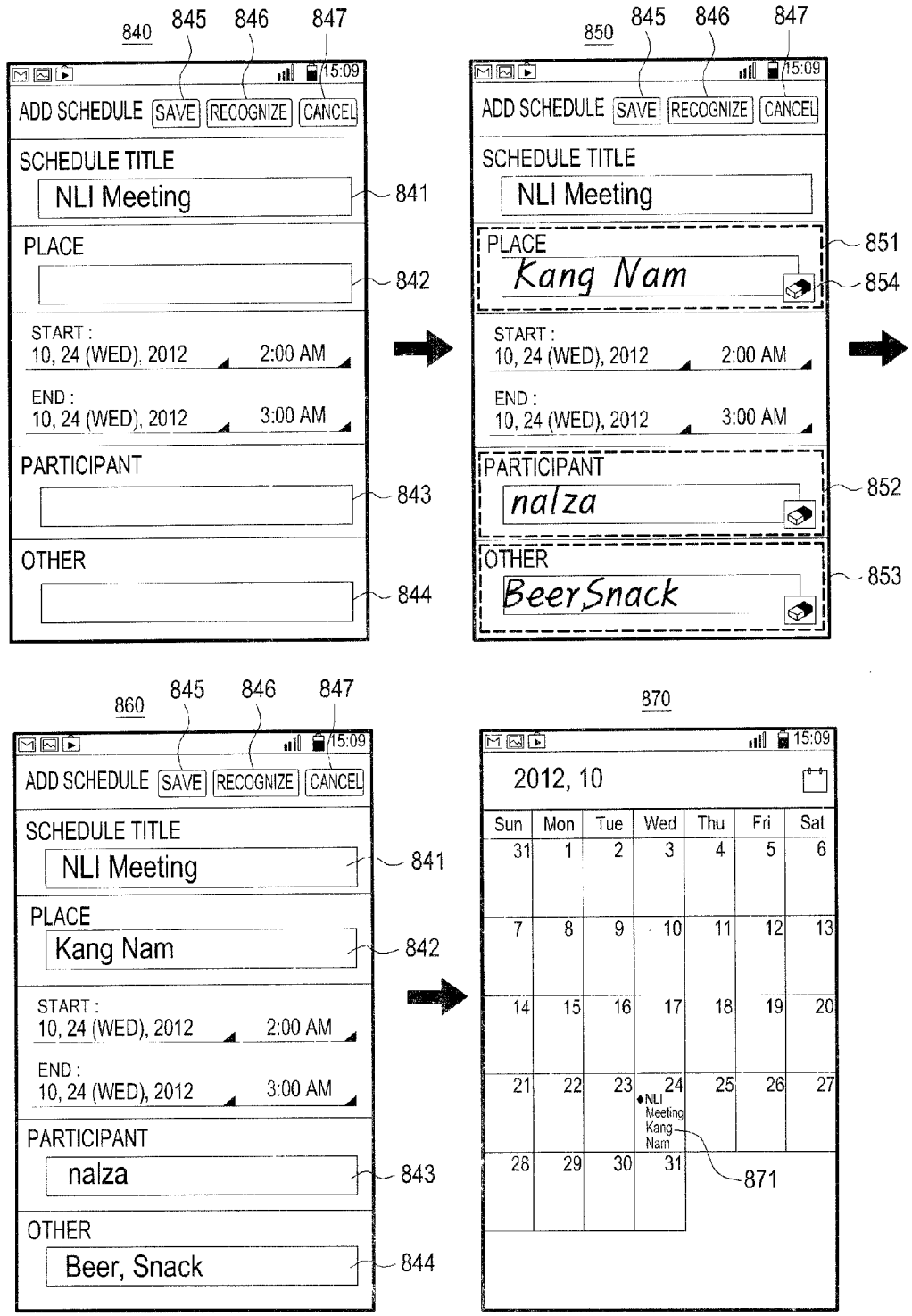

FIGS. 8A and 8B illustrate examples of displaying text in input fields of a scheduler application in a portable terminal according to an embodiment of the present disclosure.

Referring to FIG. 8A, the portable terminal, such as the portable terminal 100, may display a plurality of time units provided by the application as indicated by reference numeral 810. For example, the plurality of time units may be a calendar provided by the application. The user may select a specific time unit from among the plurality of time units to write a schedule. For example, the user may select a specific date by marking the specific date among the dates of the calendar, as indicated by reference numeral 811. In another example, the user may select a plurality of dates from among the dates of the calendar by dragging a touch pen as indicated by reference numeral 812. In yet another example, the user may input an intended date in an area of a screen as indicated by reference numeral 813.

After selection of a time unit, the portable terminal 100 may provide a feedback 821 requesting a schedule for the selected date. The user may write a schedule title 822 related to the selected time unit in an area of the screen.

Upon receipt of the schedule title, the portable terminal 100 may provide a pop-up window 831 to enter details of the schedule as indicated by reference numeral 830. When the user selects an input field 832 to input details, the portable terminal 100 may further provide a screen so that the user may input details.

Referring to FIG. 8B, the portable terminal 100 may provide a screen including a plurality of input fields 841 to 844 to request details of the schedule as indicated by reference numeral 840. Among the input fields 841 to 844, the received schedule title 822 may be converted into text and displayed in the schedule title input field 841. A recognize button 846 is used to start recognition of a handwriting image input to each input field, convert the handwriting image to text, and insert the text in the input field. A save button 845 is used to save the state of an input field in which text is inserted. A cancel button 847 is used to return the state of an input field to its pre-text insertion state.

Referring to reference numeral 840, the portable terminal 100 may provide handwriting input layers 851, 852 and 853 corresponding to the input fields 842, 843 and 844 except for the input field 841 already having text. The user may write a location, a participant, and other information in the handwriting input layers 851, 852 and 853 using a touch pen. If the user wants to re-input the handwriting image in the handwriting input layer 851, the user may delete the contents of the handwriting input layer 851 by selecting an erase button 854. Upon selection of the erase button 854, the contents written in the handwriting input layer 851 may all be erased or the last stroke written in the handwriting input layer 851 may be erased. If a multiple handwriting input layers are provided, erase buttons may be provided for each of the handwriting input layers to erase contents written in each individual handwriting input layer. In another example, a single erase button may be provided to erase all of contents written in the handwriting input layers.

The portable terminal 100 may receive the handwriting images of the location, participants, and other information written in the handwriting input layers 851, 852 and 853 and convert the received handwriting images into text, as indicated by reference numeral 860. In an example, if the portable terminal 100 has not received a user's handwriting input for a time period, the portable terminal 100 may start handwriting recognition. In another example, the portable terminal 100 may convert an input handwriting image to text at a time interval. In the case where the portable terminal 100 includes the recognize button 846 and the user selects the recognize button 846, the portable terminal 100 may convert all of the input handwriting images into text, insert the text into the respective input fields 842, 843 and 844, and display the input fields 842, 843 and 844 with the text.

If the user finishes inputting the details of the schedule using the touch pen, the portable terminal 100 may display at least a part of the schedule inputs at the selected time unit, as indicated by reference numeral 870. For example, if the application provides a plurality of times unit in the form of a calendar, the portable terminal 100 may display the schedule title and location in the calendar in an area related to a specific time unit, as indicated by reference numeral 871.

In another embodiment, if the portable terminal 100 displays a plurality of time units provided by the application as indicated by reference numeral 810 in FIG. 8A and the user selects one of the plurality of time units, the portable terminal 100 may display reference numeral 840 of FIG. 8B without performing steps 820 and 830. That is, upon selection of one of the plurality of time units, the portable terminal 100 may display the input fields 841 to 844 related to the selected time unit and the portable terminal 100 may provide handwriting input layers corresponding to the fields except for the schedule title input field 841. The portable terminal 100 may receive a handwriting image in each of the provided handwriting input layers, recognize the received handwriting image as text, insert the text in the input fields, and display the input fields with the text.

The present disclosure can be actively used with documents of a predetermined format having an input field. Particularly, convenience can be provided to a user by applying the present disclosure to official documents in public facilities. Conventionally, a civil petitioner fills necessary information in an official form using a pen in a public service center. After the form is completed, a civil officer re-inputs the contents written by the civil petitioner into a computer based on the filled form submitted by the civil petitioner. However, if the present disclosure is used in an official document application, the civil petitioner can input the necessary information using a touch pen similar to writing information in an official form using a pen in the public service center. Therefore, paper can be saved and the civil officer is relived of the inconvenience of re-inputting the contents written of the form. When user authentication is performed before an official document application is displayed, the basic personal information about the user may be inserted in input fields of an official form. Consequently, the user does not need to input the personal information each time.

Figure 9A:
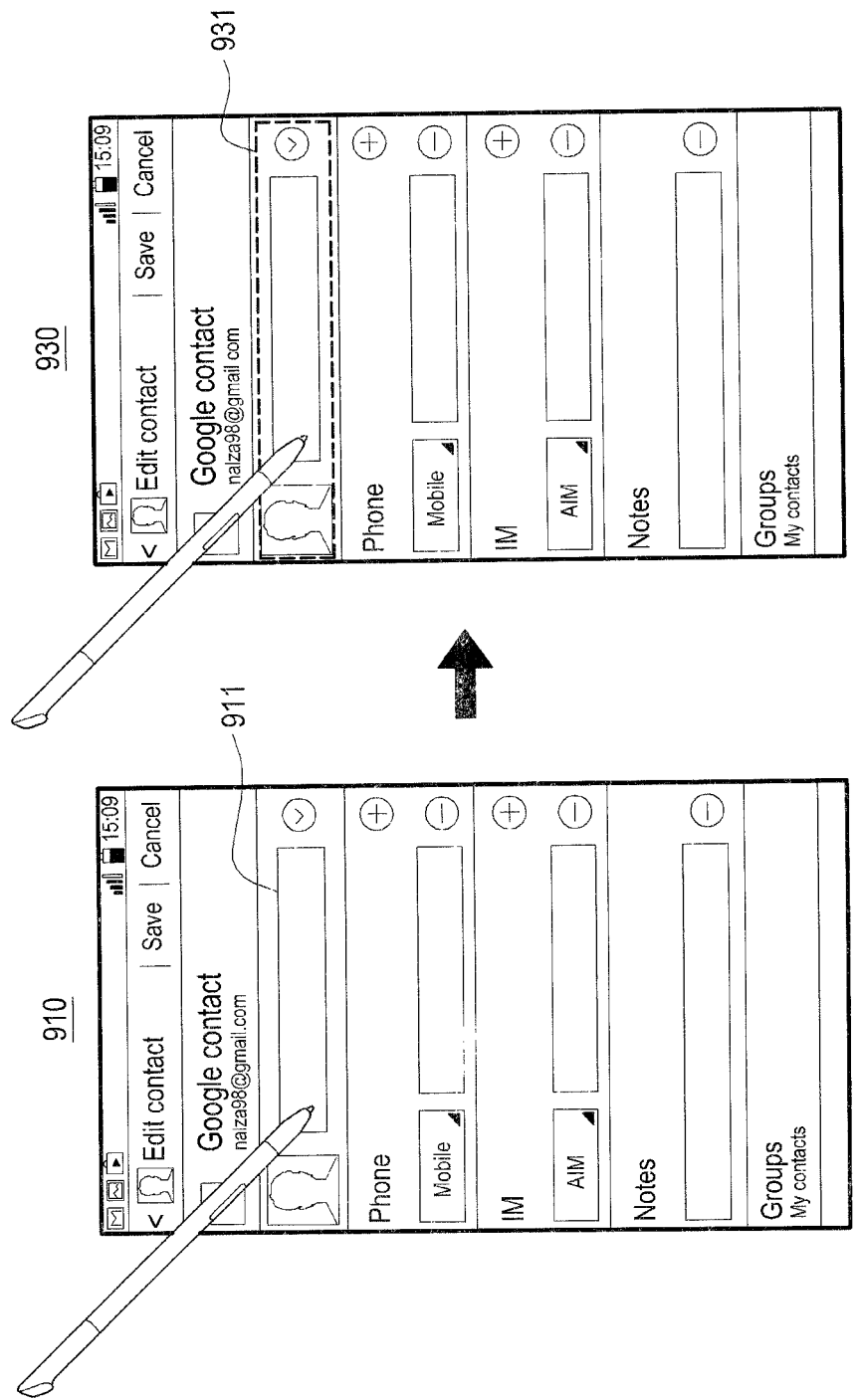
FIGS. 9A and 9B illustrate an example of displaying text in input fields in a portable terminal according to an embodiment of the present disclosure.
Figure 9B:
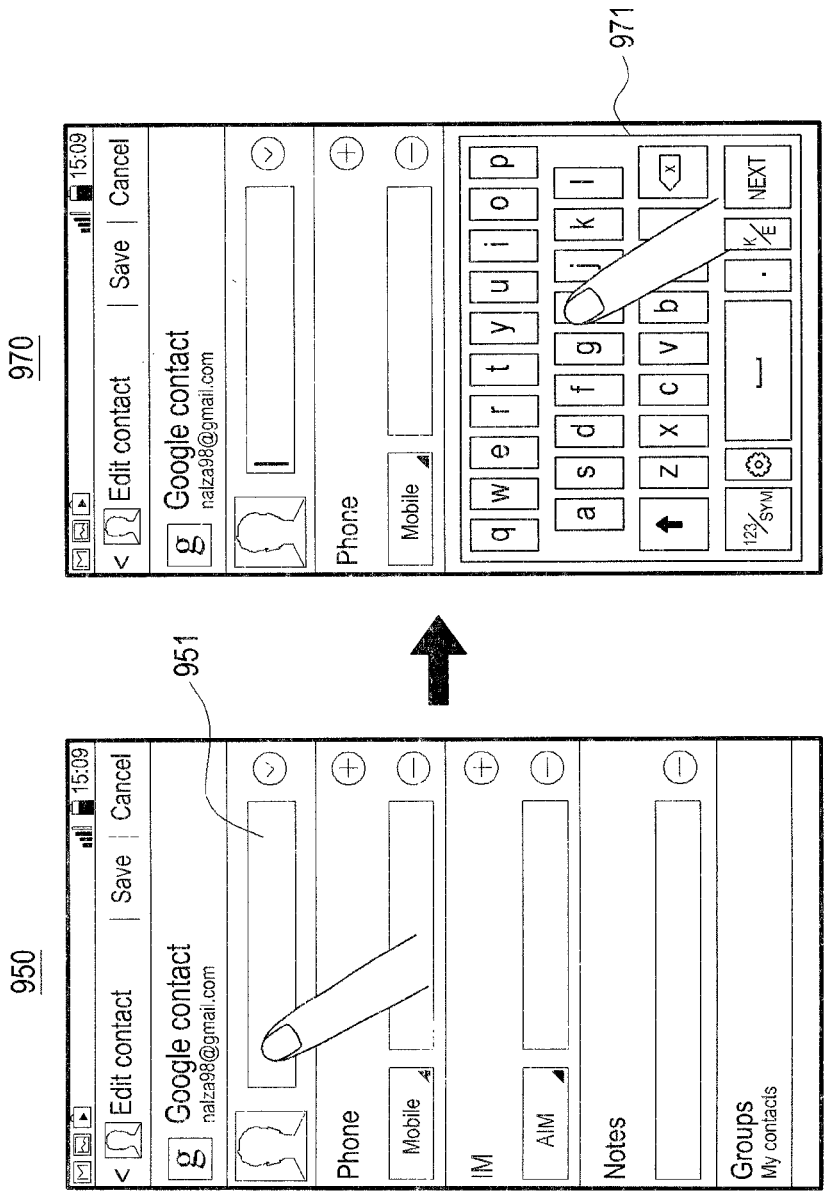

FIGS. 9A and 9B illustrate an example of displaying text in input fields in the portable terminal 100 according to an embodiment of the present disclosure.

FIG. 9A illustrates an event where a user touches a portable terminal using a touch pen and FIG. 9B illustrates an event where a user touches a portable terminal using the user's finger.

Referring to FIG. 9A, the portable terminal 100 may display an application including input fields on the touch screen 140, as indicated by reference numeral 910.

When the user touches an input field 911 using a touch pen or withdraws the touch pen from the portable terminal 100, the portable terminal 100 may provide a handwriting input layer 931 on the input field 911 to receive a handwriting input through the touch pen, as indicated by reference numeral 930.

Referring to FIG. 9B, the portable terminal 100 may display an application having an input field 951 on the touch screen 140, as indicated by reference numeral 950.

When the user touches the input field 951, the portable terminal 100 may provide a keypad 971 in an area of the touch screen 140 to receive a touch input to enter text into the input field 951, as indicated by reference numeral 970.

Figure 10:
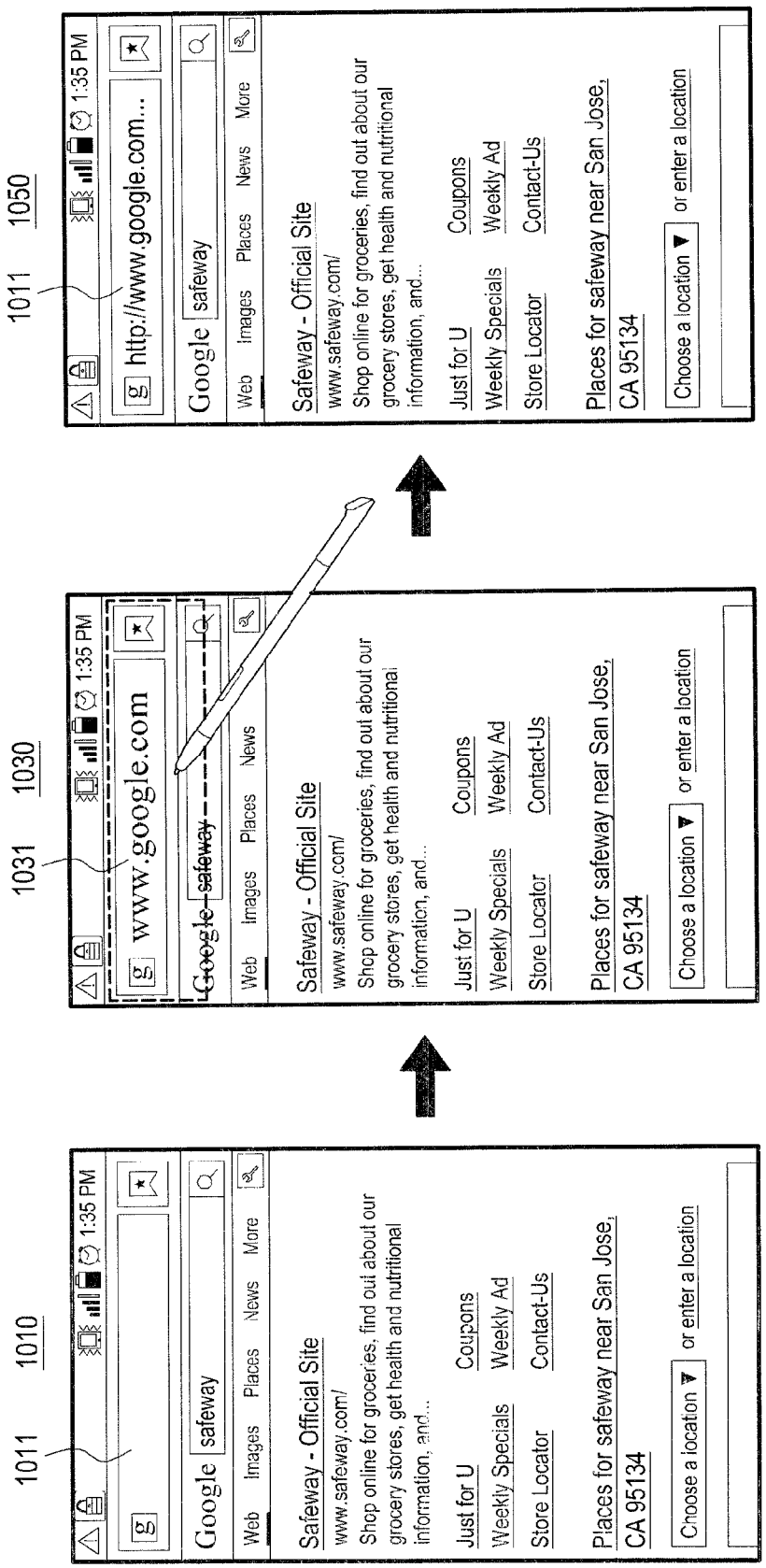
FIG. 10 illustrates an example of displaying text in an input field of a web browser application in a portable terminal according to an embodiment of the present disclosure.

FIG. 10 illustrates an example of displaying text in an input field of a web browser application in a portable terminal according to an embodiment of the present disclosure.

Referring to FIG. 10, the portable terminal, such as the portable terminal 100, may display a web browser application having an input field 1011 to receive a Web address, as indicated by reference numeral 1010.

The portable terminal 100 may provide a handwriting input layer 1031 on the input field 1011, as indicated by reference numeral 1030. The size of the handwriting input layer 1031 may be larger than the input field 1011. In this case, the user may control the size of the handwriting input layer 1031 by a touch and drag gesture on the handwriting input layer 1031 or using an additional menu. If a user has weak eyesight, resizing the input layer 1031 can increase the user accessibility of inputting a handwriting image.

The portable terminal 100 may receive a handwriting input from the user through the handwriting input layer 1031 such as a handwriting image 'www.google.com' through the handwriting input layer 1031, as indicated by reference numeral 1030.

The portable terminal 100 may recognize the received handwriting image and acquire text corresponding to the recognized handwriting image, as indicated by reference numeral 1050. The text may be inserted into the input field 1011. The portable terminal 100 may insert the text 'www.google.com' into the input field 1011 and may access a web page indicated by the text.

Figure 11:
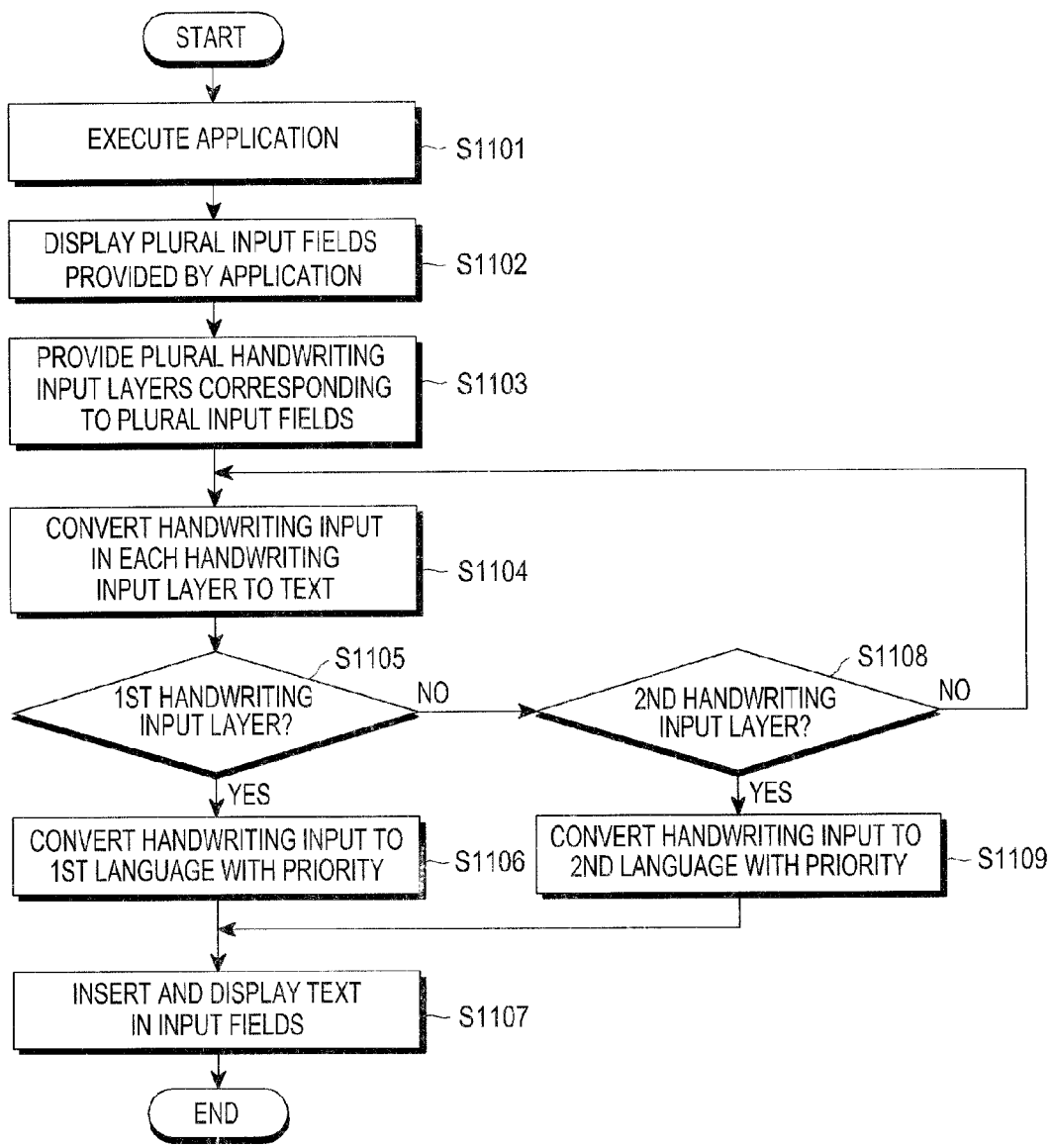
FIG. 11 is a flowchart illustrating a handwriting input method in a portable terminal according to another embodiment of the present disclosure.

FIG. 11 is a flowchart illustrating a handwriting input method in a portable terminal according to another embodiment of the present disclosure.

Referring to FIG. 11, the portable terminal, such as the portable terminal 100, may display a specific application on the touch screen 140 by executing the specific application at operation S1101. In this case, a plurality of input fields provided by the application may be displayed on the touch screen 140 at operation S1102. The portable terminal 100 may provide a plurality of handwriting input layers corresponding to the plurality of input fields to receive a user's handwriting input at operation S1103.

Subsequently, the portable terminal 100 may receive handwriting images in the plurality of handwriting input layers through a touch pen and convert the handwriting images into text at operation S1104. In this case, the portable terminal 100 may convert handwriting images to multiple texts using a first type of a first priority preset in one of the plurality of handwriting input layers. The first type of a first priority has been preset from among a first language, a second language, digits, and special symbols.

For example, if a first language (e.g. Korean) is set as a first type for an input field corresponding to a first handwriting input layer and a second language (e.g. English) is set as a first type for an input field corresponding to a second handwriting input layer, the portable terminal 100 may determine whether a current handwriting input layer is the first handwriting input layer at operation S1105 and may convert a handwriting image input into the first handwriting input layer to text of the first language with priority at operation S1106. If the current handwriting input layer is not the first handwriting input layer, the portable terminal 100 may determine whether the current handwriting input layer is a second handwriting input layer at operation S1108. If the current handwriting input layer is the second handwriting input layer, the portable terminal 100 may convert a handwriting image input to the second handwriting input layer into text of the second language with priority at operation S1109.

Then the portable terminal 100 may insert text recognized from the plurality of handwriting input layers in their respective input fields at operation S1107.

Figure 12:
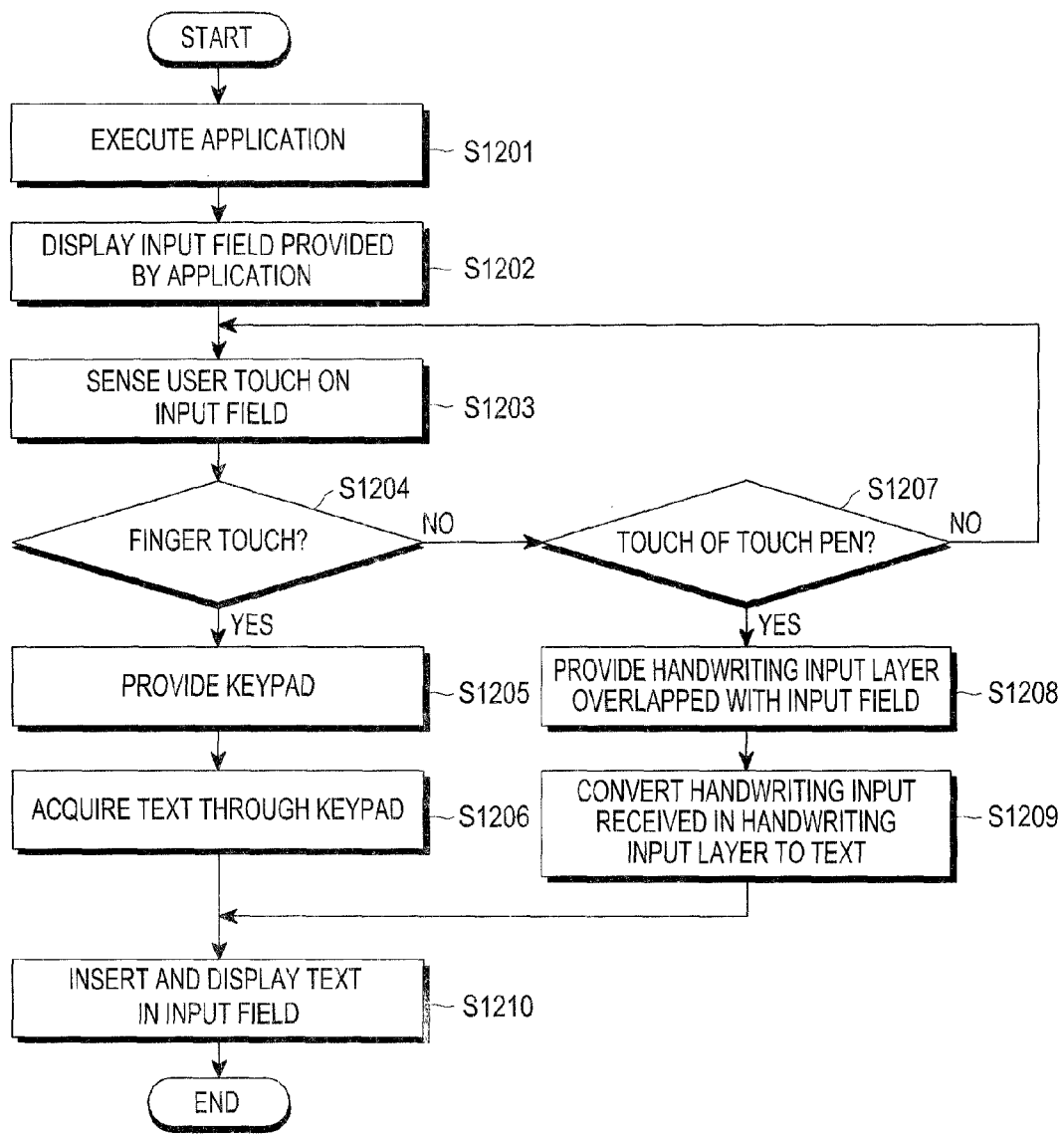
FIG. 12 is a flowchart illustrating a handwriting input method in a portable terminal according to a further embodiment of the present disclosure.

FIG. 12 is a flowchart illustrating a handwriting input method in a portable terminal according to a further embodiment of the present disclosure.

Referring to FIG. 12, the portable terminal, such as the portable terminal 100, may display a specific application on the touch screen 140 by executing the specific application at operation S1201. In this case, an input field provided by the application may be displayed on the touch screen 140 at operation S1202.

The portable terminal 100 may sense a user's touch on the input field at operation S1203 and may determine whether the user's touch is a finger touch S1204. In the touch is a finger touch, the portable terminal 100 may provide a keypad in an area of the screen to receive a finger input at operation S1205. The portable terminal 100 may then acquire user-selected text through the keypad at operation S1206. The portable terminal 100 may insert the acquired text in the input field and display the input field with the text at operation S1210. Referring back to operation 1204, if the touch is not a finger touch, the portable terminal 100 may determine whether the touch is a pen touch of the touch pen at operation S1207. The determination may be made simultaneously with operation S1204 or operation 1204 may follow operation S1207. In the case of a pen touch, the portable terminal 100 may provide a handwriting input layer overlapped on the input field to receive a touch pen-based input at operation S1208. Subsequently, the portable terminal 100 may recognize a handwriting image received in the handwriting input layer and convert the recognized handwriting image into text at operation S1209. Then the portable terminal 100 may insert the text into the input field and display the input field with the text at operation S1210.

As is apparent from the above description, the present disclosure enables fast data input to an executed application by means of a touch pen in a portable terminal. Especially, since a handwriting image is input to an input field of the application through the touch pen, a fast and intuitive interface can be provided to a user.

It will be understood that the embodiments of the present disclosure can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g. a computer), such as a CD, a DVD, a magnetic disk, or a magnetic tape.

The portable terminal using a touch pen and the handwriting input method using the same according to the present disclosure can be implemented in a computer or portable terminal that has a controller and a memory, and the memory is an example of a machine-readable storage medium suitable for storing a program or programs including commands to implement the embodiments of the present disclosure. Accordingly, the present disclosure includes a program having a code for implementing the apparatuses or methods defined by the claims and a storage medium readable by a machine that stores the program. The program can be transferred electronically through a medium such as a communication signal transmitted via a wired or wireless connection, which and the equivalents of which are included in the present disclosure. Further, the portable terminal using a touch pen and the handwriting input method using the same according to the present disclosure can receive the program from a program providing device connected by cable or wirelessly and store it. A user can selectively limit the operations of the present disclosure to a user terminal or extend the operations of the present disclosure to interworking with a server over a network by adjusting settings of the portable terminal.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A handwriting input method using a touch pen in a portable terminal, the method comprising:
    displaying at least one input field provided by an application by executing the application;
    providing a handwriting input layer overlapping the input field based on withdrawal of the touch pen from the portable terminal;
    receiving a handwriting image in the handwriting input layer using the touch pen;
    converting the received handwriting image to text; and
    displaying the at least one input field with the text inserted,
    wherein, if the application includes a plurality of the at least one input fields, the providing of the handwriting input layer comprises providing a plurality of handwriting input layers corresponding to the plurality of the at least one input fields, the providing of the plurality of the handwriting input layers based on the withdrawal of the touch pen from the portable terminal, and
    wherein the conversion of the received handwriting image comprises converting the handwriting image received in the plurality of handwriting input layers to a type with priority, the type being selected from a first language, a second language, numerals, and special symbols.

2. The method of claim 1, wherein, if at least one populated input field of the plurality of input fields includes text, the providing of a plurality of handwriting input layers comprises providing handwriting input layers corresponding to input fields except for the populated input field.

3. The method of claim 1, wherein the conversion of the received handwriting image comprises, if a conversion button is selected, converting all of the handwriting images received in the plurality of handwriting input layers to text.

4. The method of claim 1, wherein the providing of the handwriting input layer comprises:
    providing an erase button for erasing the handwriting image received in the handwriting input layer, and
    erasing at least a part of the received handwriting image, upon selection of the erase button.

5. The method of claim 1, wherein the displaying of the input field comprises:
    displaying a plurality of time units provided by the application; and
    displaying, upon selection of one of the plurality of time units, an input field for inputting contents related to the selected time unit.

6. The method of claim 1, wherein the conversion of the received handwriting image comprises:
    converting a handwriting image received in a first handwriting input layer of the plurality of handwriting input layers to a first type with priority, the first type being preset to one of a first language, a second language, numerals, and special symbols; and
    converting a handwriting image received in a second handwriting input layer of handwriting input layers to a second type with priority, the second type being preset as one of the first language, the second language, the numerals, and the special symbols, different from the first type.

7. The method of claim 1, wherein the conversion of the received handwriting image comprises:
    receiving coordinates of points touched in the at least one input field;
    storing the coordinates of the points as strokes;
    generating a stroke array list using the strokes; and
    converting the handwriting image to the text using a pre-stored handwriting library and the stroke array list.

8. A portable terminal using a touch pen, the portable terminal comprising:
    a touch screen configured to:
        display at least one input field provided by an application by executing the application,
        provide a handwriting input layer overlapping the at least one input field based on withdrawal of the touch pen from the portable terminal, and
        receive a handwriting image in the handwriting input layer using the touch pen; and
    at least one processor configured to:
        convert the received handwriting image received from the touch screen to text, and
        display the at least one input field with the text inserted,
        wherein, if there are a plurality of the at least one input fields, the at least one processor is configured to provide a plurality of handwriting input layers corresponding to the plurality of the at least one input fields, the providing of the plurality of the handwriting input layers based on the withdrawal of the touch pen from the portable terminal, and wherein the conversion of the received handwriting image comprises converting the handwriting image received in the plurality of handwriting input layers to a type with priority, the type being selected from a first language, a second language, numerals, and special symbols.

9. The portable terminal of claim 8, wherein, if at least one populated input field of the plurality of the input fields includes text, the at least one processor is configured to provide handwriting input layers corresponding to the plurality of input fields except for populated input field.

10. The portable terminal of claim 8, wherein, if a conversion button is selected, the at least one processor is configured to convert all of the handwriting images received in the plurality of handwriting input layers to text.

11. The portable terminal of claim 8, wherein the at least one processor is configured to:
provide an erase button to erase the handwriting image received in the handwriting input layer, and
upon selection of the erase button, erase at least a part of the received handwriting image.

12. The portable terminal of claim 8, wherein the touch screen is configured to:
display a plurality of time units provided by the application, and
upon selection of one of the plurality of time units, display an input field for inputting contents related to the selected time unit.

13. The portable terminal of claim 8, wherein the at least one processor is configured to:
convert a handwriting image received in a first handwriting input layer among the plurality of handwriting input layers to a first type with priority, the first type being set to one of a first language, a second language, numerals, and special symbols, and
convert a handwriting image received in a second handwriting input layer among the plurality of handwriting input layers to a second type with priority, the second type being set to one of the first language, the second language, the numerals, and the special symbols, different from the first type.

14. The portable terminal of claim 8, wherein the at least one processor is configured to:
receive coordinates of points touched in the at least one input field,
store the coordinates of the points as strokes,
generate a stroke array list using the strokes, and
convert the handwriting image to the text using a handwriting library and the stroke array list.

15. At least one non-transitory processor readable medium for storing a computer program of instructions configured to be readable by at least one processor for instructing the at least one processor to execute a computer process for performing the method as recited in claim 1.

16. The portable terminal of claim 8, wherein the at least one processor is configured to:
if the handwriting image is written in an overlapped area between the plurality of handwriting input layers, determine which layer the handwriting image belongs to, taking into account an input order or starting position of the handwriting image.

17. The portable terminal of claim 8, wherein the at least one processor is configured to:
automatically insert personal information about user in at least part of at least one input field, if user authentication is performed.

* * * * *